S. A. SLOCOMB.
Grain and Fruit Cleaner.
No. 109,680. Patented Nov. 29, 1870.
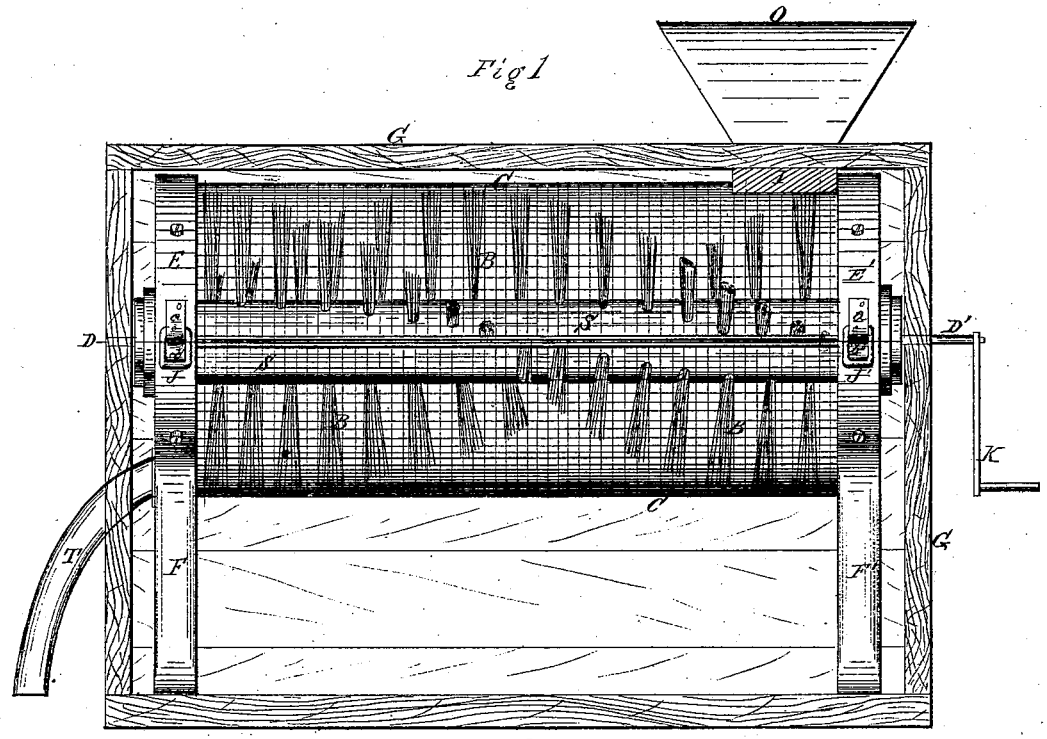

United States Patent Office.

SILAS A. SLOCOMB, OF PHILADELPHIA, PENNSYLVANIA.

Letters Patent No. 109,680, dated November 29, 1870.

IMPROVEMENT IN GRAIN AND FRUIT-CLEANERS.

The Schedule referred to in these Letters Patent and making part of the same.

*To all whom it may concern:*

Be it known that I, SILAS A. SLOCOMB, of the city and county of Philadelphia, State of Pennsylvania, have invented a new and "improved Grain and Fruit-Cleaner;" and I do hereby declare that the following is a full, clear, and exact description of the construction and operation of the same, reference being had to the accompanying drawing and to the letters of reference marked thereon.

The object of my invention consists in providing a machine for cleaning and separating fruits, grains, &c., from stems, dirt, dust, and other refuse matter and impurities, and it is particularly adapted for cleaning cockle from wheat.

To accomplish this, I employ a hollow cylinder, composed of wire-cloth made in two parts, and provided in the interior with a revolving brush, the beard of which is arranged spirally on a central shaft, to which is attached a crank or pulley for rotating it.

The whole apparatus is inclosed by means of a casing provided with a hopper for feeding grain or fruit to the interior of the cylinder, and one end of the cylinder is provided with a spout for discharging it.

Figure 1 is a side elevation of my improved grain and fruit-cleaner, with the outer casing shown in section.

Figure 2 is an end elevation of same.

Figure 3 is a transverse section of the upper half of the cylinder.

Figure 4 is a transverse section of the lower half of same.

To enable those skilled in the art to make and use my invention, I will now proceed to describe its construction and operation.

The hollow cylinder C, composed of wire-cloth, is divided, longitudinally, into two semicircular parts, and has its ends secured in two circular flanges E and E', similarly divided.

The said flanges inclose the ends of the cylinder, and are elevated at the proper height on the feet F and F', and they are joined together by means of hinges, H and H', placed on one side and on the outer circumference of each, so that the upper one can be opened in order to give access to the interior of the cylinder, and when closed they are held securely together by means of catches J and J'.

The catch J or J' is made in the simplest form possible, so that it may be engaged or disengaged, when it is desired to close or open the cylinder, and for this purpose it is made of one piece of wire, and is bent so as to assume a rectangular shape, with the two joining ends passed loosely through a block, *a*, attached to the upper half of the flange E or E', and the opposite or closed end passes over a block, *b*, secured to the lower half of the flange.

The interior of the cylinder C is provided with a revolving brush, B, which passes through it in the direction of its length.

The beard or bristles of the said brush are arranged spirally on a wooden shaft, S, the ends of which are provided with journals D and D', which pass through and work in suitable bearings made in the center of each flange.

The beard or bristles of the brush are made of such a length that they may be freely turned without coming directly in contact with the inner sides of the cylinder, and they are arranged spirally on the shaft S, so as to propel the grain or other articles from the end of the cylinder at which it is fed to the opposite and discharge-end.

The wire-cloth composing the cylinder C is secured to the flanges E and E', in the manner as shown in figs. 3 and 4 of the drawing—that is, with the ends clamped between the rim *d* and semicircular bands N N, by means of bolts *r r* passed through them.

The lower part of the flange E is provided with a spout, T, which communicates, through an opening made in the flange, with the interior of the cylinder, through which the grain or other articles are discharged after being thoroughly cleaned or picked.

The journal D' extends out a short distance beyond the end of the cylinder, and bears on it a crank, K, or a suitable pulley for rotating the brush.

The whole apparatus is inclosed by means of a casing, G, provided at the upper part with a hopper, O, which communicates with the interior of the cylinder C through a square-shaped opening, I, made in the wire-cloth of same.

In the full-size machine, where the cylinder C is of greater length, an upright is employed to support it in the center.

When wheat is fed into the cylinder through the hopper O, the grains are thoroughly separated, and kept in a continuous rotary motion owing to the revolutions of the brush, and are thrown against the sides of the cylinder, the wire-cloth of which is made sufficiently fine to permit any cockle or other impurities to pass through, at the same time the cleaned grain, owing to the spiral form of the brush, is propelled to the opposite end of the cylinder, where it is discharged.

In the case of raisins or currants the stems will catch into meshes of the wire-cloth, and the brush, in revolving, will come in contact with the fruit and separate it from them, (the stems.)

The cylinder C can be readily taken apart, so as to substitute a fine or coarse screen, to suit the different articles being cleansed.

Having thus described my invention, its construction and operation,

What I claim, and desire to secure by Letters Patent of the United States, is—

1. The combination of the screen-cylinder C, when composed of the hinged sections, flanges E and E', shaft S, and brush B, constructed and operating as and for the purpose set forth.

2. In combination with the bisected screen-cylinder, with its flanges and brush, as described, the removable case G, as and for the purpose set forth.

In testimony whereof, I have hereunto signed my name in the presence of two subscribing witnesses.

SILAS A. SLOCOMB.

Witnesses:
CHARLES H. EVANS,
GEO. E. NICHOLS.